(12) United States Patent
Konzak et al.

(10) Patent No.: US 6,436,165 B1
(45) Date of Patent: Aug. 20, 2002

(54) FOLIAR PHOSPHATE FERTILIZERS

(75) Inventors: Calvin F. Konzak; Enrique A. Polle, both of Pullman, WA (US)

(73) Assignee: Kamterter II LLC, Lincoln, NE (US)

( * ) Notice: Subject to any disclaimer, the term of this patent is extended or adjusted under 35 U.S.C. 154(b) by 0 days.

(21) Appl. No.: 08/261,759

(22) Filed: Jun. 17, 1994

Related U.S. Application Data

(63) Continuation of application No. 07/981,748, filed on Nov. 24, 1992, now abandoned, which is a continuation-in-part of application No. 07/858,401, filed on Mar. 26, 1992, now abandoned, which is a continuation of application No. 07/761,250, filed on Sep. 18, 1991, now abandoned, which is a continuation of application No. 07/270,737, filed on Nov. 14, 1988, now abandoned.

(51) Int. Cl.$^7$ .................................................. C05B 7/00
(52) U.S. Cl. ................................................. 71/33; 71/35
(58) Field of Search ..................... 71/3, 33, 27, 32, 71/35

(56) References Cited

U.S. PATENT DOCUMENTS 4,581,056 A * 4/1986 Nooden et al. ................. 71/27

FOREIGN PATENT DOCUMENTS

SU 0566809 * 8/1977 ..................... 71/27

OTHER PUBLICATIONS

Silberstein O. and Wittwer, S.H., "Foliar Application of Phosphatic Nutrients to Vegetable Crops", *American Society of Horticultural Science* (1951) 58:179–190.

Koontz, H. and Biddulph, O., "Factors Affecting Absorption and Translocation of Foliar Applied Phsophorus", *Plant Physiology,* (1957) 32:463–470.

\* cited by examiner

*Primary Examiner*—Paul Marcantoni
(74) *Attorney, Agent, or Firm*—Vincent L. Carney

(57) ABSTRACT

Foliar fertilizers which include a phosphate ester in concentrations greater than approximately ½ molar with water. The phosphate esters are preferably polyhydroxy alcohol orthophosphate esters, such as ethylene glycol phosphate esters. The fertilizer solutions or mixtures are provided with a water miscible hygroscopic agent which retains the applied fertilizers on the leaf in liquid form by extracting moisture from the atmosphere. The hygroscopic agent is preferably provided by an appropriate hygroscopic alcohol such as used in the production of the esters, or substitutes thereof. The esters can be formed into substituted salts using metals or other elements which are preferably of nutritional value to plants. Methods for the production of the esters and fertilizers are described. Also described are novel methods of use and fertilization using the foliar fertilizer compositions.

19 Claims, No Drawings

FOLIAR PHOSPHATE FERTILIZERS

RELATED CASES

This application is a continuation, of application Ser. No. 07/981,748, filed Nov. 24, 1992, now abandoned, which is a continuation-in-part of U.S. patent application Ser. No. 07/858,401 filed Mar. 26, 1992, now abandoned, in the name of Konzak, et al. for Foliar Phosphate Fertilizers, which is a continuation of U.S. application Ser. No. 07/761,250 filed Sep. 18, 1991, now abandoned, which is a continuation of U.S. patent application Ser. No. 07/270,737 filed Nov. 14, 1988 now abandoned.

TECHNICAL FIELD

This invention relates to aqueous foliarly applicable phosphorus fertilizers and methods for production thereof.

BACKGROUND OF THE INVENTION

Foliar application of phosphorus fertilizers is known and has been used for many years in spite of certain difficulties such as for example: (1) leaf damage in the form of necrotic areas or burning of the leaves; (2) difficulties in achieving absorption of phosphorus bearing compounds through the waxy cuticle of the leaf; (3) poor translocation from the leaf to other parts of the plant through the narrow phloem vessels. The tendency to cause nutritional imbalances under some circumstances.

To avoid leaf burning or necrosis associated with prior art fertilizers, the agriculturist typically diluted the phosphorus containing fertilizers with substantial amounts of water. When these relatively dilute solutions are used at low application rates, such as 10 or 20 gallons per acre, very little nutritive value is associated with the fertilizer. For most annual crops such as cereal grains, the volumes of fertilizer to be applied are preferably less than 10 gallons per acre. This is particularly true when herbicides are to be applied at the same time.

Because under some circumstances inadequate nutritive value is obtained from the foliar application of phosphate fertilizer without damage to the plants from burning, it is more common to apply phosphate fertilizers to the soil. Many versions of phosphates have been applied to the soil ("The Role of Phosphorus in Agriculture", F. E. Khasawneh, E. C. Sanple and E. J. Kamprath, Eds. *American Soc. of Agron.*, Madison, Wis., 1980) but one of them is of special interest. That type is disclosed in Soviet Union patent 566,809 to Borisov which discloses phosphate esters for application to the soil and a method of making them. Also, a procedure for synthesizing an ethylene glycol phosphate was taught by P. Carre (Compt. Rend. 138: 374–37. Carre (Compt. Rend. 138: 374–375, 1904).

The use of a phosphate ester for soil fertilization is based on the belief that a low reactivity of the organic compound will avoid phosphorus fixation (plant unavailability) in the soil. Neither the patent to Borisov nor the publication of P. Carre disclose use of a phosphate ester as a foliar fertilizer and the methods they disclose for the synthesis of their phosphate ester are time-consuming and have low yields. The yields are sufficiently low and the time preparation sufficiently long as to render them uneconomical.

SUMMARY OF THE INVENTION

Accordingly, it is an object of the invention to provide novel phosphorus-containing fertilizer and method of synthesizing it for foliar application.

In accordance with the above and further objects of the invention, crops are fertilized by spraying a liquid solution onto the leaves of the plants, which liquid solution contains at least one phosphate together with other ingredients such that the solution: (1) is sufficiently concentrated to be of substantial nutritive value to the plants when applied at an appropriate volume per acre, such as having a phosphate ester concentration above 0.5 molar; (2) is in liquid form with sufficient fluidity for spraying; (3) remains in liquid form without crystalizing for a sufficient time to be absorbed by the leaves and provides a sufficiently low osmotic pressure to avoid necrosis of the leaves when absorbed; (4) is able to translocate throughout the plant from the leaves with efficiency; (5) is able to penetrate into the leaves easily; (6) when appropriately formulated does not cause nutritional imbalances in the plant; and (7) is economical to use. For most applications, the fertilizer is applied at a rate of less than 10 gallons per acre but for some plants than can tolerate more phosphate or need more to obtain nutritional balance it may be higher such as for example 40 gallons per acre in two twenty gallon per acre spraying runs.

In its preferred form, the liquid solution: (1) is either hygroscopic or includes sufficient hygroscopic material or both so as to draw moisture from the air and maintain itself in liquid form; and (2) has improved capabilities for sticking to and remaining on the leaves of plants being fertilized, which can advantageously be provided by a water miscible or water emulsifiable adhering agent which helps to retain the phosphate ester compound and hygroscopic agent on the leaf during application and rainfall.

One category of such phosphorus containing fertilizers includes at least one phosphate ester compound. The phosphate ester compounds are formed by reacting a phosphoric acid and ethylene glycol with an esterification promoter such as a metal oxide or hydroxide in a sufficient amount for a sufficient time and under pressure and temperature conditions that enhance water removal without carbonization, resulting in a relatively high yield. The ethylene glycol phosphate esters may then be neutralized and boiled to convert the diesters and triesters to monoesters. The material provides an excess of ethylene glycol to increase its hygroscopic properties and is diluted to mobility suitable for foliar application.

The phosphate ester compounds are typically produced using alcohols consisting of or incorporating an alkane diol or triol having a carbon chain length of preferably 2 to 4, more preferably 2 to 3 and most preferably 2. The phosphate esters are present in the liquid fertilizers in amounts of one-half molar. The phosphate ester compounds are preferably present in the aqueous fertilizer solution in concentrations from 0.5 to 4 molar. More preferably, the concentrations range from 1 to 3 molar of the applied phosphate ester compound.

The preferred fertilizer mixtures or solutions remain in a sustained liquid state sufficiently long to avoid crystalization, such as from one to seven days. The sustained liquid state is preferably accomplished by a water-miscible hygroscopic agent. This may be accomplished through the hygroscopic activity of the ester and/or other hygroscopic agent which allows moisture to be taken from the atmosphere to maintain the fertilizer in an active liquid form on the foliage. The hygroscopic agent is preferably liquid and can be provided as an excess amount of a suitable non-phytotoxic alcohol such as the alkane diol or triol alcohol used in compounding the alcohol phosphate ester forming the active source of phosphorus in the fertilizer solution.

Preferably, the liquid hygroscopic agent or agents is: (1) present in amounts sufficient to maintain the applied fertilizer sprays in liquid form on the plant leaf for a sustained period after application, such as 1–7 days; (2) included in amounts sufficient to provide collective concentration thereof of approximately one molar or greater; and (3) is provided in collective concentrations of approximately 1 to 10 molar. The hygroscopic agent is advantageously the phosphate ester and/or alcohol forming one of the moieties of the phosphate ester.

Generally, the foliar fertilizer is intended to solve a dilemma that has been determined. That dilemma occurs because of two conflicting factors.

One factor is that foliar feeding of plants has been of limited use due to problems of penetration and translocation of the applied nutrients. Some fertilizer compounds penetrate the waxy cuticle of the leaves with difficulty. In many cases this is due to rapid crystallization of the fertilizer on the leaf surface impeding its subsequent movement through the cuticle. In the case of macronutrients like phosphorus, relatively large amounts of the nutrient need to be foliarly absorbed to be effective. However, it has not been possible previously to supply foliarly such large amounts of phosphorus because the application of phosphorus at high rates has caused "leaf burning" as described in "Foliar fertilization", A. Alexander, Ed. Martinus Wijhoff Publishers, 1986, Dordrecht.

The other factor is that, when phosphorus is applied in compositions that do not crystallize (because of their hygroscopic properties in humid air) leaf burning is caused by osmotic effects due to local accumulation of the fertilizer if translocation does not proceed at a high rate. In addition to the above problems, some foliar fertilizers are not properly metabolized by the plant, resulting in nutritional imbalances.

DETAILED DESCRIPTION

The foliarly applicable phosphorus fertilizer compositions according to this invention include an aqueous solution or mixture containing at least one phosphate ester compound or mixtures of phosphate ester compounds. The phosphate ester compounds include a phosphate moiety, preferably the orthophosphate moiety ($PO_4^{-3}$) with hydrogen or substituted cations, and an alcohol moiety.

The preferred alcohols: (1) have relatively short carbon chain lengths to provide effective absorption and translocation within the plants being treated; (2) have alkane carbon chains of 2–4 carbon atoms, more preferably 2–3 carbon atoms, and still more preferably 2 carbon atoms; (3) are polyols (containing multiple hydroxy groups (polyhydroxy)), and are preferably diols or triols, with diols most preferred; (3) are water miscible and non-phytotoxic both in the esterified form and as any free alcohols which are present in the fertilizer solutions either by design or due to limited hydrolysis of the esters in the aqueous fertilizer solutions; and (4) have hygroscopic properties as a free alcohol and in the phosphate ester forms.

To best provide this combination of characteristics, the preferred alcohols for use in the phosphate ester fertilizers of this invention include ethylene glycol ($C_2H_4(OH)_2$), propylene glycol ($C_3H_6(OH)_2$) and glycerol ($C_3H_5(OH)_3$). Other hygroscopic, non-phytotoxic and water miscible alcohols may also be appropriate for use in the novel fertilizers.

The preferred alcohols are used in the fertilizer solutions in at least the form of water soluble or water miscible phosphate alcohol esters. Preferred phosphate alcohol esters include ethylene glycol phosphate esters, propylene glycol phosphate esters, and glycerol phosphate esters. Other forms of phosphate esters may also be acceptable such as diethylene glycol phosphate esters, triethylene glycol phosphate esters and others.

The phosphate alcohol esters included in amounts to provide ½ molar or more and are more preferably present in the aqueous fertilizer solutions in amounts sufficient to provide molar concentration of approximately ½–4 moles of phosphate alcohol ester per liter of fertilizer solution. This corresponds to a range of approximately 5–45% by weight (w/w) of the fertilizer solution. More preferably, the phosphate alcohol esters are present in molar concentrations of approximately 0.5–4 moles, still more preferably 1–3 moles per liter of fertilizer solution. The latter corresponds to a range of approximately 10–30% (w/w) of the fertilizer solution.

The use of relatively high concentrations of the active source of phosphorus in an aqueous phosphorus fertilizer solution is novel and is radically different from the very dilute, less than 0.1 molar, solutions used in prior art foliar phosphorus fertilizers. Although the exact mechanisms which make these novel concentrated phosphate ester fertilizers possible is not known with certainty, it is believed that the hygroscopic nature of the ester and its chemical nature are of importance.

The preferred hygroscopic agents include at least some free non-phytotoxic, water soluble or water miscible alcohol. The alcohols described hereinabove for use as moieties in the phosphate esters are also preferred hygroscopic agents in this invention. The free (non-esterified) alcohols provide additional hygroscopic properties beyond the phosphate esters which are significant in maintaining the applied fertilizer solutions in liquid forms on the plant leaves to thereby enhance absorption of the nutrients into the plants. In most situations the free alcohols present in the fertilizer solutions are of the same type as used in the phosphate alcohol esters forming the primary active source of phosphorus. Alternatively, it may be possible to use other appropriate non-phytotoxic, water soluble or water miscible, hygroscopic alcohols, such as described above, mixtures thereof, or functional substitutes thereof, for performing as the hygroscopic agent(s). Other suitable hygroscopic agents, such as sugars, e.g. sorbitol, may also be useful in this invention.

The non-esterified hygroscopic alcohols or other hygroscopic agent(s) can be included in the fertilizer compositions preferably in molar concentrations of approximately 0.5–5 moles per liter of fertilizer solution. This corresponds to weight percentages of approximately 0.5–30% (w/w) of the fertilizer solutions. More preferably the desired hygroscopic, non-phytotoxic, water miscible alcohols are included in amounts sufficient to produce molar concentrations of approximately 1–4 moles per liter of solution. This corresponds to weight percentages of approximately 6–24% (w/w) of the fertilizer solutions. The collective concentration of all hygroscopic agents is approximately 1 molar or greater, preferrably 1–10 molar.

The phosphate esters used as the primary source of phosphorus in the fertilizer solutions can also be provided in a variety of substituted phosphate ester forms. Preferred variations include elements having nutritional value and being substituted for hydrogens of the $H_2PO_4^{-1}$ radical to form salts of the esters. The substitutions are preferably accomplished using metals and/or other ions which provide elements which are of nutritional value to the plants for which a particular fertilizer solution is being formulated. Preferred nutritional elements for use in this invention include copper, iron, magnesium, manganese, cobalt, calcium, and zinc. Ions such as the ammonium ion ($NH_4^+$) and others are also useful. Other non-metal elements of nutritional or other value are also potentially of use in the substituted forms of the phosphate alcohol esters.

The foliage adhering agent can be constituted from a number of suitable mixtures or compounds that provide the fertilizer solutions with improved capabilities for sticking to and remaining on the leaves of plants being fertilized. A suitable foliage adhering agent is crude soy lecithin. Preferred concentrations of crude soy lecithin are approximately in the range 2–10 grams per liter of fertilizer solution, or higher.

The fertilizers can also advantageously be provided with a surfactant or other surface tension lowering agent to better spread the droplets of fertilizer over the leaf surface and improve absorption. One suitable surfactant for use as a water miscible or water emulsifiable foliar spreading agent is sold under the trademark, ARMIX 185, available from DeSoto Chemical Corporation of P.O. Box 23523, Harahan, La. 70813. The ARMIX 185 is preferably added in the amounts of approximately 1–4 ml per liter preferably 1.6 ml per liter of fertilizer. Another suitable surfactant is L-77 (trademark SILWET) from Union Carbide Corp., Silicones and Urethane Intermediates Div., Danbury, Conn. 06817. The L-77 is preferably added in amounts sufficient to provide approximately 0.04–2 ml per liter of fertilizer. Other non-ionic, non-phytotoxic, water miscible or water emulsifiable surfactants are also expected to be suitable as spreading agents.

The fertilizer solutions may also include a suitable water miscible or water emulsifiable, non-phytotoxic phloem mobility agent or mixture of suitable agents. Such agents serve to enhance the translocation of phosphorus compounds within the plant to increase the efficiency of the fertilizer solutions. Suitable phloem mobility agents are benzyl adenine and benzyl amino purine. Preferred concentrations of these agents are 100–400 milligrams per liter, more preferably 200 mg/liter of fertilizer solution.

With the use of these agents, difficulties in achieving absorption and mobility within the plant of phosphorus bearing compounds through the waxy cuticle of the leaf are overcome. They keep the material in the liquid state and increase the mobility of the absorbed phosphorus compounds within the plant. Translocation of phosphorus from the leaf to other parts of the plant primarily occurs via narrow phloem vessels. In contrast to some simple polyphosphates and orthophosphate formulations which tend to remain on or within the plant leaves without effectively being translocated to other areas of the plant, the phosphate esters readily move to other portions of the plant.

The fertilizer solutions containing phosphate esters as described above are preferably acidic to neutral. Testing with a variety of crops indicates that applied phosphorus fertilizer solutions according to this invention may be effective when provided with pH of approximately 3–7, and pH of approximately 3–5 most preferred in at least some crops due to greater effectiveness of the fertilizers without significant damage to the crop. Fertilizer solutions with approximate pH 3 to pH 3.5 are desired for many plants, such as wheat, potato, tomato, peas, maize and sorghum.

The pH of the fertilizer solutions can be adjusted using a variety of neutralization or pH adjusting techniques. The preferred techniques for pH adjustment employ the addition of acid neutralizing compounds as such, or in aqueous solutions, which also preferably provide elements of nutritional value to plants. Examples of suitable neutralizing agents which can be used in the fertilizer solutions include potassium hydroxide (KOH); sodium hydroxide (NaOH); calcium hydroxide ($Ca(OH)_2$); and ammonium hydroxide ($NH_4OH$). These or other neutralizing agents are added in amounts sufficient to bring the particular fertilizer solution being pH adjusted within the desired pH range.

Fertilizer formulations in accordance with the inventions are expected, under suitable conditions of phosphorus deficiency, to provide yield response and/or growth enhancement for at least the following crops: wheat, clovers, alfalfa, peas, potatoes, tomatoes, maize, sorghum, barley and oats. These fertilizer compositions are also expected to be useful with other plants and crops.

The fertilizers can be applied to totally cover the plant leaf, as in diluted solutions for fruit trees, or sprayed in discrete droplets which cover only a small portion of the leaf. Droplet application is preferred for several reasons, such as for example: (1) it decreases the number of points where the foliage is penetrated by the fertilizer to reduce possible injury effects to the plant leaves; (2) it enables significantly higher concentrations to be used than where total leaf coverage application is employed; (3) it enhances the effect of the hygroscopic agent in maintaining the fertilizer in liquid form on the leaf for a greater period of time; and (4) it more easily permits applications of less than 20 gallons of applied spray per acre and solutions of 20% (w/v) of equivalent $P_2O_5$ content, or higher. The droplets should be at least 250 microns in diameter and preferably at least 50 percent of them should be 250 microns or greater in diameter.

The phosphate ester compounds used in the fertilizer compositions are preferably synthesized using an improved process for esterification of phosphoric acid. The basic process involves combining phosphoric acid and the desired water miscible, hygroscopic, non-phytotoxic, polyhydroxy alcohol. The alcohol is preferably provided in amounts sufficient to provide molar ratios of alcohol:phosphoric acid ranging from 1:1 to 2:1, or higher when compared to the molar amounts of phosphate radical (alcohol:phosphate radical). The phosphoric acid combined with the alcohol is preferably orthophosphoric acid ($H_3PO_4$). Other forms of phosphoric acid, particularly pyrophosphoric acid may be useful, possibly requiring an appropriate adjustment of the process. The phosphoric acid is preferably processed to reduce water content prior to beginning esterification. The liquid spray applied to the plants should have less than 20 percent by weight of simple phosphate salts and preferably less than 15 percent by weight.

The combined phosphoric acid and suitable alcohol are heated preferably to temperatures in the approximate range of 150°–220° C. This reaction temperature range is believed to cause the following esterification reactions shown in equations 1 and 2 to occur: where R—OH represents one or more appropriate alcohol(s).

Reaction equation 1 indicates that upon heating the orthophosphoric acid ($H_3PO_4$) is believed to condense to pyrophosphoric acid ($H_4P_2O_7$), liberating water in the process. The pyrophosphoric acid is believed to act as the phosphorylating agent for incorporating phosphorus into the ester. In reaction 1 the equilibrium moves significantly to the right as water is eliminated from the system and/or the temperature is increased. The boiling temperature of the reaction mixture, such as at atmospheric pressure, depends upon the boiling point of the mixture and on the stability of the alcohol in the acid media. With a simple mixture of ethylene glycol and phosphoric acid in an open reaction vessel, the boiling temperature increases as the reaction proceeds, resulting from the removal of water from the system. However, at temperatures above 150° C. we found that carbonization of organic compounds present in the mixture occurs. This carbonization significantly limits conversion of the reactants to the phosphate alcohol esters forcing reduction of the temperature and increasing the reaction times.

After may vials, the unexepected result was obtained that the boiling temperature and the esterification rate in a mixture of a suitable polyol, such as ethylene glycol, and orthophosphoric acid can be increased considerably without carbonization if at least one or more appropriate esterification promoters, such as a metal oxide or hydroxide is added to the reaction mixture during esterification. Such oxides or hydroxides are preferably selected from oxides or hydroxides which have metals or other ionic moieties which are of nutritional value to plants.

Examples of suitable hydroxide compounds having such nutritional value include potassium hydroxide, sodium hydroxide, calcium hydroxide, magnesium hydroxide, manganese hydroxide, zinc hydroxide, copper hydroxide, cobalt hydroxide, iron hydroxide and others.

Examples of suitable oxide compounds include copper oxides, cobalt oxides, iron oxides, manganese oxides, magnesium oxide, zinc oxide, calcium oxide and others. Hydroxide promoters to be used are preferably selected from hydroxides having

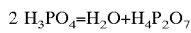

$$2\ H_3PO_4 = H_2O + H_4P_2O_7 \qquad \text{EQUATION 1}$$

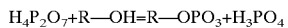

$$H_4P_2O_7 + R\text{---}OH = R\text{---}OPO_3 + H_3PO_4 \qquad \text{EQUATION 2}$$

monovalent cation moieties, such as potassium hydroxide and sodium hydroxide. Potassium hydroxide is most preferred because of the importance of potassium in plant nutrition and the potentially derogatory buildup of sodium salts in the soil.

Oxide promoters are preferably selected from oxides having divalent or of higher valency, cation moieties, for example, calcium oxide, zinc oxide, magnesium oxide, manganese oxide, copper oxides, cobalt oxides, iron oxides and others. Except for sodium, the metals of these hydroxides and oxides are nutrients required by plants.

The specific action of the oxide or hydroxide in the reaction is not understood, but its dramatic effect in preventing carbonization and allowing esterification to proceed at greater reaction rates has been clearly demonstrated.

The oxides are believed to increase the reaction rate by reacting to reduce the amount of water present in the reaction system. The action of the oxide or hydroxide may also be to provide either oxygen or hydroxide radical which combine with hydrogen freed during the condensation and esterification reactions thus facilitating completion of the reaction to the desired phosphate ester products and water. It has also been discovered that the addition of at least some of the hydroxides or oxides indicated above also cause the boiling temperature of the reaction mixture to be increased at a given reaction pressure, such as atmospheric. This increase in the reaction temperature allows the esterification process to proceed at increased rates.

The esterification promoting hydroxides or oxides are preferably included in amounts so that the total molar amounts of oxides and/or hydroxides present during esterification are approximately 10–80% of the molar amount of the phosphorus present in the phosphoric acid. In the case of at least some of the divalent metal oxides, molar amounts of approximately 10–15% of the molar amounts of phosphorus are even more preferred since this amount is enough to promote the esterification. The hydroxides are typically included in amounts approximately ranging from 80–90% of the molar amount of phosphorus present. After esterification the pH is generally adjusted to 3–7 with additional quantities of hydroxides. The oxides or hydroxides typically selected will provide elements, particularly metals or ions, which substitute for hydrogens of the phosphate portion of the esters. The resulting substituted esters can be produced with mixed substitutions using a number of different ions in a single batch of fertilizer; or alternatively, the fertilizer compositions can be produced using a single substituting element, metal or ion. A number of different forms of the alcohol phosphate esters can be produced, each with different substituting metal, metal ion or other elements of value. These different esters can then be blended to provide a fertilizer blend containing the desired mix of secondary and/or trace elements of need for the particular plant(s) being fertilized or soil types in which they are being grown.

In the production of foliarly-applicable plant fertilizers, it has been found desirable to use hydroxide or oxides which provide substitution of sodium (Na), potassium (K), calcium (Ca), magnesium (Mg), manganese (Mn), copper (Cu), iron (Fe), zinc (Zn), cobalt (Co), and others. More particularly, it has been found desirable to use the following oxides: CaO, MgO, MnO, CuO, $Fe_2O_3$, ZnO, and CoO. Sodium hydroxide (NaOH) and potassium hydroxide (KOH) may also appropriately be used in promoting the esterification reactions under the present invention. Other esterification promoters are also likely to be effective in such reaction systems.

The amounts of the divalent cation moiety oxides, such as Fe, Cu, Co, Zn, Mg and Mn are limited because these oxides tend to have substantially lower solubilities in the reaction and resulting mixture, as compared to the monovalent cation moiety hydroxides, such as K and Na. In general, the nutritional requirements of plants for the divalent ions is much lower and the solubility decrease does not prevent effective amounts from being included as substituted ions in the phosphate ester mixtures of this invention.

The use of zinc oxide in particular has been found to be especially efficient in promoting esterification of phosphoric acid and ethylene glycol and can be included in relatively small quantities while preventing carbonization of the reaction mixture, promoting esterification, and increasing the boiling point. Zinc oxide, zinc metal, platinum metal and possibly other elements or compounds may be effective at providing a catalytic effect which substantially speeds the esterification reaction of phosphoric acid with ethylene glycol or other alcohols as explained above.

The preferred molar ratio of a suitable alcohol or alcohols, such as ethylene glycol, to phosphoric acid used in the reaction mixture is preferably greater than 1.0 (ethylene glycol:phosphoric acid). Ratios between 1.0 and 2:1 provide excess ethylene glycol which help to facilitate production of the phosphate esters with reduced reaction times. The excess alcohol remains primarily unreacted. The residual ethylene glycol or other suitable alcohol can be either removed, or more preferably, remain in the final solution for use as a hygroscopic agent in the novel fertilizer compositions.

The promoter or promoter mixture is preferably added to a mixture of suitable alcohol and phosphoric acid. The promoter is also preferably added prior to substantial heating of the alcohol and phosphoric acid reactant mixture. Addition of one or more of the promoters can occur prior to the addition of the ethylene glycol or other suitable alcohol to the phosphoric acid. When Ca, Mg, Zn, Fe or Cu oxides are used, it is possible to add one or more of the promoters after the phosphoric acid has been heated below 175° C. during a preliminary water removal processing.

The phosphoric acid used is preferably orthophosphoric acid, such as white industrial grade orthophosphoric acid. Pyrophosphoric acid and/or other more condensed forms of phosphoric acids may also be possible for use in this invention.

The esterification reaction mixture is preferably brought to temperatures in the preferred range of approximately 150°–220° C., or possibly higher, as needed to cause boiling of the mixture in order to eliminate water, and to cause esterification. More preferably the reaction temperatures will be 160°–220° C. The presence of water in the reaction mixture, either due to its presence in the initial reactants or as generated during the esterification reaction, inhibits the conversion of the alcohol and phosphoric acid to the desired phosphate esters. Thus, it is desirable to employ appropriate procedures and equipment to assist in the removal of water from the reaction mixture. stirring means can also be employed to mix the reactants to provide more uniform heating and better assist in vaporization of the water generated in the reactions. Reduction of the vapor pressure in the reaction vessel may also be desirable with the qualification that any associated boiling point depression does not slow the reaction or reduce conversion to an extent which is derogatory to the desired production of the esters. Similarly, it may be desirable to increase pressures in the reaction vessel in order to increase reaction temperature or for other desired purposes. In general, atmospheric pressure has been found suitable for successful reaction to produce ethylene glycol phosphate esters. Reaction pressures of approximately 0.5–2 atmospheres or higher are believed operable.

The reaction time needed to convert the esters, such as ethylene glycol and orthophosphoric acid to ethylene glycol phosphate esters in a batch process, is approximately 4–6 hours depending upon the amounts in the reaction mixture, the specific procedures followed, the type of reactants used, the composition of the reaction mixture, and the temperatures and pressures at which the reaction is maintained. The reaction times for other suitable alcohols may vary.

The degrees of esterification achieved from the reaction preferably provides for conversion of a majority or more, such as approximately 60% or more of the phosphoric acid into alcohol phosphate esters. More preferably the conversion rate is at least 80% or more. Some esterification reactions have produced 90% conversions with some loss of esterification, up to approximately 10%, upon dilution of water.

The reacted esterified mixture will presumably contain some proportion of diesters and triesters in addition to monoesters. It may be desirable for use in at least some foliar fertilizers to convert such diesters and triesters to monoesters because of the possibly greater ease of assimilation of the monoesters by plants when foliarly applied. When the pH of the reacted or resultant mixture is acidic then monoesters, diesters and triesters are expected to be present. Diesters and triesters can be converted to monoesters by adding water and a suitable hydroxide, such as KOH or NaOH, to neutralize the mixture to a pH of approximately 7. The solution is then boiled which converts the diesters and triesters to monoester forms because of the instability of the diesters and triesters under these conditions. Approximately ten minutes of boiling is typically sufficient to bring about the conversion to monoesters.

The finished reaction product is preferably pH adjusted to provide a value from approximately 3 to 7. This range of pH has been found best for phosphorus uptake efficiency. The pH is preferably adjusted using potassium hydroxide, anhydrous ammonia ($NH_3$), aqueous solutions thereof, or other pH adjusting compositions which preferably provide additional desired potassium, nitrogen or other plant nutrient in the final fertilizer solutions. The solubility of some of the ions, such as Ca, Zn, Mg and others, will become saturated when the pH is adjusted to higher values. The solubility limits for any particular ion depends on the pH and the quantities and relative balances of the ions present in the mixture.

With the nutrients used to adjust the pH and to promote esterification, a balance of elements essential to plant nutrition is provided simultaneous with the absorption of phosphorus compounds. Other major, secondary and trace nutrient elements include calcium (Ca), magnesium (Mg), zinc (Zn), iron (Fe), manganese (Mn), cobalt (Co) and other plant nutrients.

The use of the esterification reaction product as a foliar fertilizer also typically involves dilution with water. The amount of dilution will vary dependent upon the desired method of application, type of crop and other factors. The applicants have discovered that relatively concentrated solutions of 0.5–4 molar of the novel phosphate ester fertilizers can be foliarly applied. These concentrated fertilizers can be foliarly applied because of a controlled release of nutrients from a hygroscopic combination of the alcohol phosphate esters and residual hygroscopic free alcohol. In such situations the final fertilizer solutions typically are constituted approximately 35–45% by weight with the final esterification reaction mixture product. The remaining approximately 55–65% is water, unreacted glycol and additives included in the final fertilizer solutions to be applied.

EXAMPLE 1

Ethylene Glycol Phosphate Esters Synthesis & Fertilizer Mixture Including Mg, Zn, Ca, K, and N A 5 liter digestion flask was adapted for being fitted with an appropriate condenser for condensing water vapor removed during esterification within the digestion flask. White 12.1 molar (M) orthophosphoric acid was placed into the digestion flask in an amount of 1927 milliliters (ml) thus providing 23.317 moles of P. The orthophosphoric acid had a specific gravity of 1.575 and phosphorus content equivalent in $P_2O_5$ content of 54.5% (w/v) (weight/volume percent). Note: 200 grams $P_2O_5$ in 1 liter solution equals 20% (w/v). A few chips of carbon were added to the phosphoric acid to help regulate boiling during subsequent heating, Alternatively, a flask provided with a suitable stirring device could have been employed.

The reaction flask was placed in a heating mantle and heated below 175° in order to distill approximately 470–480 ml of water from the phosphoric acid solution. Thereafter 58.76 grams (g or gm) of MgO (1.46 moles) was dissolved in the phosphoric acid. Industrial grade ethylene glycol was then added in the amount of 2600 ml to the resulting solution thus providing 46.634 moles of ethylene glycol having a specific gravity of 1.091.

While the resulting mixture was heated, 11.87 g of ZnO (0.146 moles) was dissolved therein. Then 81.73 g of CaO (1.46 moles) was further dissolved in the heating mixture. The resulting mixture of reactants started boiling at approximately 160° C. The temperature was raised gradually in about 1.5 hours to 168° C. A vertical condenser was then connected and the mixture boiled for approximately 2 additional hours to carry out the esterification reaction. The condenser was removed to assist in removal of large vapor release and the temperature of the liquid reaction mixture was approximately 155°–157° C. The temperature of the reaction mixture was raised to 165°–170° C. over a period of 1 hour and 15 minutes.

Power to the heating mantel was then turned off and the mixture was allowed to cool to approximately 80°. The carbon chips were filtered out. The remaining reaction product constituted approximately 3 liters of liquid which was adjusted to 3.5 liters by adding water. The resulting solution was a viscous acidic liquid with specific gravity of 1.41 and pH of less than 1 containing approximately 6.66 moles of elemental phosphorus per liter.

The water adjusted reaction product was then neutralized to achieve a higher pH of approximately 3.1 using 532.5 g KOH (9.492 moles) dissolved to 950 ml of water. Also used in the neutralization was 676 ml of 15.46 molar aqua ammonia (10.45 moles of $NH_3$) of 26° Be, specific gravity of 0.891 (262.85 g/l $NH_3$). The volume was adjusted to 7.571 1 (2 gallons) with water. The resulting fertilizer solution thus contained approximately 3.1 moles of P per liter which is equivalent to 1.54 moles of $P_2O_5$ or 21.85% (w/v) $P_2O_5$ equivalent. The resulting fertilizer solution also contained 0.468% (w/v) Mg; 0.772% (w/v) Ca; 0.126% (w/v) Zn; 4.896% (w/v) K and 1.93% (w/v) N. The specific gravity was approximately 1.22.

The resulting fertilizer solution also provides estimated analysis constituting approximately 30–45% (w/w) (weight/weight) ethylene glycol phosphate esters; 25–20% (w/w) unconverted residual ethylene glycol; 4–5% (w/w) orthophosphates other than phosphate esters; and the remainder, approximately 30–40% (w/w), water.

EXAMPLE 2

Ethylene Glycol Phosphate Esters Synthesis & Fertilizer Mixture Including Mg, Zn, Ca and N Forms The procedure was the same as in Example 1 up to the water adjusted 3.5 liters of 6.666 molar P solution was obtained. Such solution was then neutralized to pH 4.2 by the addition of 1489 ml of 26° Be aqua ammonia (23.022 moles $NH_3$), and the volume was then adjusted to 7.571 liters with water. The composition of the resulting fertilizer solution included 21.85% (w/v) $P_2O_5$; 0.468% (w/v) Mg; 0.772% (w/v) Ca; 0.126% (w/v) Zn; and 4.26% (w/v) N. The specific gravity of the fertilizer solution was approximately 1.20.

EXAMPLE 3

Ethylene Glycol Phosphate Esters Synthesis and Conversion to Monoesters Fertilizer Mixtures Sodium Form Place in a 5 liter boiling flask with an appropriate condenser 1115 ml of ethylene glycol (20 moles) and mix with 826 ml of 12.1 molar orthophosphoric acid (10 moles) having phosphorus content equivalent to 54.5% (w/v) of $P_2O_5$. Add slowly an aqueous solution containing 325 g NaOH (8.125 moles) in 1100 ml volume. Add a few carbon chips. Distill out 1740–1750 ml of water over about 3 hours 15 min. The temperature in the liquid should be about 200° C. Disconnect the condenser and bring the temperature to approximately 210° C. Continue heating for an additional 7 minutes. The temperature will then be approximately 220° C. At this point, the degree of esterification should be approximately 90%. Cool to about 80° C. Add slowly 700 ml of water and bring to a boil. Boil for 10 minutes. Add slowly 700 ml of water containing 55 gm (for pH 3.1) or alternatively 280 gm (for pH 7) of NaOH. Boil for 10 minutes. Filter while hot and complete volume to 2.5 liters. The resulting solution will have a phosphorus concentration of 4M with a phosphorus content equivalent to 28.4% (w/v) $P_2O_5$, pH of approximately 3.1 or 7 depending on whether the amount of NaOH added was 55 gm or 280 gm, respectively. The solution will contain mainly monoesters in the sodium form when the final pH is 7 and a mixture of monoesters, diesters and triesters when the final pH is 3.1. The pH7 solution will have a specific gravity of 1.42 g/ml and will remain liquid even at −10° C. The conversion to monoesters can be done using KoH instead of NaOH in a similar procedure.

EXAMPLE 4

Ethylene Glycol Phosphate Esters Synthesis & Fertilizer Mixtures Potassium Form

Place in a 5 liter flask 1200 ml of 12.1 molar white orthophosphoric acid (14.52 moles of P), 1652 ml of ethylene glycol (29.04 moles) and 662 g KOH (11.8 moles) dissolved to 1180 ml with water. Distill out 2 liters of water by boiling below 190° C. (about 3 hours from the initial boiling start). Cool to 80° C., add 500 ml of water and boil for 10 minutes. Cool. Neutralize to pH 7.2 with 10.98 ml of a solution containing 616 g of KOH (1098 moles). Boil for 10 minutes and adjust the volume to 3.630 liters. This solution is 28.38% (w/v) $P_2O_5$ (4 M P) and 24.54% (w/v) K. The specific gravity is 1.42.

Foliar fertilizers in accordance with the invention provide the following functional advantages:
a) Capability of readily penetrating plant leaves, yet maintaining liquidity and fertilization activity on the plant leaf surface over a period of at least one day, preferably several days or longer;
b) Rapid mobilization of phosphorus within the plant which is readily transported away from the point of entry of fertilizer from droplets into the plant; and
c) Sufficient solubility to permit dissolution and application of fertilizer solutions which can contain up to or greater than 18 pounds of $P_2O_5$ equivalent phosphorus in ten gallons of solution.

It has been found preferable to provide liquid phosphorus containing fertilizers which have effective phosphorus content of at least 20% weight/volume of equivalent $P_2O_5$ in the solution applied to the plant. This level of phosphorus content provides for adequate nutritive value where low spray rates are to be applied.

The invention also includes novel methods for treating or fertilizing plants by applying aqueous fertilizer solutions as described hereinabove to the foliage of such plants. The foliar fertilizers in accordance with the invention can be applied to totally cover the plant leaf or sprayed in discrete droplets which cover only a portion of the leaf. Droplet application is preferred to decrease the number of points where the foliage is penetrated by the fertilizer to reduce possible injury effects to the plants. This also enables significantly higher concentrations to be used than where total coverage application is employed. Droplet application is also believed to enhance the effect of the hygroscopic agent in maintaining the fertilizer in liquid form on the leaf for a greater period of time.

The fertilizer solutions are preferably applied in aqueous solutions having concentrations as indicated above. Application rates of approximately 2.5–20 gallons per acre appear useful depending on the particular type of crop being fertilized and the concentration of the active ingredients in the particular solution. The following examples describing crop experiments will better illustrate the desired concentrations and application rates for at least some of the types of plants for which the novel solutions and methods according to this invention are useful.

EXAMPLE 5

Wheat plants which grow in a phosphorus deficient soil, termed "Idaho Vassar Series", seldom grow tillers because of the phosphorus deficiency. It was determined that the fertilizer solutions of this invention were capable of inducing formation of tillers in two week old plants grown in this phosphorus deficient soil. The length of the first tiller evaluated one week after foliar phosphorus fertilization treatment can be taken as the measure of absorption and mobilization of phosphorus within the wheat plant. In these tiller response experiments plants were grown in a growth chamber with 16 hours of light at 20° C. and 8 hours of dark at 15° C.

Table 1 below shows the tiller response which occurred after one spray application of ethylene glycol phosphate ester solution prepared substantially as described in Example 3 given hereinabove. Fertilizer solutions used in the experiments represented in Table 1 had a pH of approximately 3.

Table 1 also shows the tiller response for an alternative commercially available potassium polyphosphate solution applied at a concentration with an effective phosphorus concentration in terms of $P_2O_5$ equivalence of 21.85% (w/v). The applied ethylene glycol phosphate ester fertilizer solution had a similar $P_2O_5$ equivalent phosphorus concentration.

The tiller response experiments represented by Table 1 constitute the average for 80 plants in each of the two groups fertilized. In this experiment, the ethylen glycol phosphate treatment is statistically very highly significantly superior to potassium polyphosphate as a phosphorus foliar fertilizer.

TABLE 1

| Type of Fertilizer | Length of First Tiller |
| --- | --- |
| Ethylene Glycol Phosphate Ester Fertilization Solution | 45.71 millimeters |
| Potassium Polyphosphate | 22.56 millimeters |

EXAMPLE 6

A tiller response experiment similar to that described in the previous example was conducted to determine the preferred rates of application of the fertilizer solutions to wheat. The solutions were prepared as described above in the previous example and in Example 3 for the pH 3 solutions. Table 2 below shows the average tiller length for 30 plants in each group as a function of different application rates of the fertilizer solutions in gallons per acre.

EXAMPLE 7

This example involves a field trial of yield response wheat to several different methods of spray application of novel ethylene glycol phosphate fertilizers described above as compared to a control group which were not treated with the foliar fertilizers. All plots in this experiment were soil fertilized with approximately 11 pounds of nitrogen per acre and 13 pounds of $P_2O_5$ equivalent phosphorus per acre in the form of a 16-20-0 dry fertilizer at the time of planting. This was applied with the seed as a starter to promote proper development of the seedlings. Also, the entire field containing

TABLE 2

| Application Rate of Ethylene Glycol Phosphate Ester Fertilizer Solution | Length of First Tiller |
| --- | --- |
| 2.5 gallons per acre | 8.5 millimeters |
| 5.0 gallons per acre | 20.4 millimeters |
| 10.0 gallons per acre | 38.0 millimeters | the plots was previously fertilized with ground-applied liquid fertilizers to achieve 50 pounds of nitrogen per acre plus 30 pounds per acre of ammonium thiosulphate placed approximately 4 inches below the seed level. Each of the plots contained 72 square feet of field. The data are presented for a total of 24 plots, six in each of the four different types of treatment (Table 3). Also presented is the average ($\overline{X}$). All of the plots treated with the novel foliar phosphate ester fertilizer solutions were treated at a rate of 10 gallons per acre using solutions prepared in accordance with Example 1, with pH of 3 and effective $P_2O_5$ concentration of 21.85% (w/v).

EXAMPLE 8

A series of greenhouse experiments were run to test the phytotoxicity and growth response of various species of plants to the alcohol phosphate ester containing foliar fertilizers of this invention. The test was run using phosphorus deficient Idaho Vassar Series soil. The experiments were performed on young plants. Tables 4–12 presented below show response data for a variety of plant types using a number of different dilutions

TABLE 3

Spring Wheat Yield Response

| | Yield of 72 ft² plot (g) | | | | | | $\overline{X}$ |
| --- | --- | --- | --- | --- | --- | --- | --- |
| Control (untreated) | 846 | 952 | 1153 | 1002 | 1126 | 1033 | 1019 |
| Sprays at start and at middle of tillering stage | 923 | 1390 | 1185 | 1020 | 1396 | 1250 | 1194 |
| Spray at start of tillering stage | 977 | 1294 | 1372 | 1020 | 1330 | 1164 | 1193 |
| Spray at middle and at end of tillering stage | 1152 | 1238 | 1295 | 1131 | 1340 | — | 1231 |

TABLE 4

(Corn--69 day hybrid, harvested 8/5/87, 26-days-old)

| | 2 plants/pot (dry wt. g) | | | | | | $\overline{X}$ |
| --- | --- | --- | --- | --- | --- | --- | --- |
| Control (untreated) | 0.75 | 0.84 | 0.73 | 0.75 | 1.25 | — | 0.86 |
| Sprayed (1), 8 days (6), 5 g/a | 1.75 | 1.67 | 1.04 | 1.45 | 1.04 | 1.37 | 1.39 |
| Sprayed (1), 8 days (6), 10 g/a | 0.97 | 1.31 | 1.46 | 1.78 | 1.44 | 1.08 | 1.34 |
| Sprayed (2), 14 days (6), 7 g/a | 0.82 | 0.84 | 1.09 | 1.05 | 0.61 | 0.96 | 0.89 |

(1) Solution 21.85% (w/v) $P_2O_5$, pH 3.
(2) Solution 17.16% (w/v) $P_2O_5$, pH 3.
(6) Days after planting.
Plants grown from seed.

TABLE 5

(Sorghum—NK 9040, harvested 8/14/87, 35-day-old)

| | 3 plants/pot (dry wt. g) | | | | | | $\overline{X}$ |
|---|---|---|---|---|---|---|---|
| Control (untreated) | 0.56 | 0.42 | 0.23 | 0.36 | 0.38 | 0.34 | 0.37 |
| Sprayed (1), 8 days (6), 5 g/a | 0.62 | 0.81 | 1.03 | 1.10 | 0.56 | 0.56 | 0.78 |
| Sprayed (1), 8 days (6), 10 g/a | 0.87 | 0.90 | 0.41 | 0.67 | 0.67 | 0.36 | 0.67 |
| Sprayed (2), 14 days (6), 7 g/a | 0.43 | 0.32 | 0.53 | 0.33 | 0.36 | 0.45 | 0.40 |
| Sprayed (3), 21 days (6), 7 g/a | 0.56 | 0.55 | 0.58 | 0.38 | 0.41 | 0.60 | 0.50 |
| Sprayed (2), 21 days (6), 7 g/a | 0.51 | 0.53 | 0.60 | 0.53 | 0.47 | 0.63 | 0.55 |

(1) Solution 21.85% (w/v) $P_2O_5$, pH 3.
(2) Solution 17.16% (w/v) $P_2O_5$, pH 3.
(3) Solution 17.16% (w/v) $P_2O_5$, pH 7.
(6) Days after planting.
Plants grown from seed.

TABLE 6

(Watermelon—harvested 9/3/87, 34-days-old)

| | 2 plants/pot (dry wt. g) | | | | | | $\overline{X}$ |
|---|---|---|---|---|---|---|---|
| Control (untreated) | 0.30 | 0.29 | 0.28 | 0.32 | 0.36 | — | 0.31 |
| Sprayed, 12 days old (6), 10 g/a (1) | 0.68 | 0.62 | 0.78 | 0.65 | 0.62 | 0.78 | 0.69 |
| Sprayed, 12 days old (6), 10 g/a (2) | 0.55 | 0.77 | 0.82 | 0.75 | 0.67 | 0.59 | 0.69 |
| Sprayed, 21 days old (6), 10 g/a (1) | 0.43 | 0.50 | 0.59 | 0.42 | 0.32 | 0.26 | 0.40 |
| Sprayed, 21 days old (6), 5 g/a (1) | 0.38 | 0.39 | 0.40 | 0.32 | 0.45 | 0.33 | 0.38 |
| Sprayed, 21 days old (6), 7.5 g/a (1) | 0.42 | 0.39 | 0.45 | 0.36 | 0.31 | 0.50 | 0.41 |

(1) Solution 12% $P_2O_5$, pH 3.
(2) Solution 17.2% $P_2O_5$, pH 3.
(6) Days after planting.
Plants grown from seed.

TABLE 7

(Tomato—harvested 9/3/87, 35 days after transplanting)

| | 1 plant/pot (dry wt. g) | | | | | | $\overline{X}$ |
|---|---|---|---|---|---|---|---|
| Control (untreated) | 1.98 | 1.46 | 1.58 | 2.22 | 2.78 | 1.68 | 1.95 |
| Sprayed 13 days after transplanting (1) | 2.68 | 3.25 | 4.09 | 2.20 | 3.34 | 3.68 | 3.21 |
| Sprayed 13 days after transplanting (2) | 2.87 | 2.65 | 3.70 | 2.62 | 2.96 | 2.72 | 2.92 |

(1) Solution 12% $P_2O_5$, 10 g/a.
(2) Solution 17.6% $P_2O_5$, 10 g/a.

TABLE 8

(Tomato—harvested 9/9/87, 55 days after transplanting)

| | 2 plants/pot (dry wt. g) | | | | | | $\overline{X}$ |
|---|---|---|---|---|---|---|---|
| Control (untreated) | 0.92 | 0.84 | 0.64 | 0.76 | 0.98 | 0.75 | 0.82 |
| Sprayed 8 days after transplanting (1) | 0.64 | 1.03 | 1.10 | 1.18 | 0.75 | 1.16 | 0.85 |
| Sprayed 21 days after transplanting (2) | 1.63 | 1.59 | 1.36 | 1.33 | 2.05 | 0.86 | 1.47 |
| Sprayed 21 days after transplanting (3) | 1.77 | 2.13 | 2.08 | 1.89 | 1.62 | 2.49 | 2.00 |
| Solution 23.3% (v/v) ethylene glycol in water, 21 days after transplanting | 1.02 | 0.90 | 0.93 | 0.85 | 0.74 | 0.84 | 0.88 |
| Solution 46.6% (v/v) ethylene glycol in water, 21 days after transplanting | 1.10 | 1.02 | 0.95 | 0.69 | 1.07 | 0.97 | 0.97 |

(1) Solution 21.85% $P_2O_5$, 10 g/a.
(2) Solution 17.6% $P_2O_5$, 7 g/a (Na form).
(3) Solution 17.6% $P_2O_5$, 7 g/a.

TABLE 9

(Beans—pinto, harvested 8/14/87, 25-days-old)

| | 2 plants/pot (dry wt. g) | | | | | $\overline{X}$ |
|---|---|---|---|---|---|---|
| Control (untreated) | 2.16 | 1.89 | 1.90 | 1.93 | 2.04 | 2.51 | 2.07 |
| Sprayed (1), 8 days (6), 7 g/a | 2.91 | 2.48 | 2.80 | 2.54 | 2.70 | 3.22 | 2.78 |
| Sprayed (2), 9 days (6), 7 g/a | 3.35 | 3.07 | 1.93 | 2.22(7) | 2.32(7) | 2.08(7) | 2.50 |
| Sprayed (3), 9 days (6), 7 g/a | 2.67 | 2.76 | 2.41 | 2.95 | 2.84 | 2.35 | 2.66 |
| Sprayed (4), 9 days (6), 7 g/a, pH 7 | 2.04(7) | 2.15(7) | 2.72(7) | 2.40(7) | 2.05(7) | 2.44 | 2.30 |

TABLE 9-continued (Beans—pinto, harvested 8/14/87, 25-days-old)

|  | 2 plants/pot (dry wt. g) |  |  |  |  |  | X̄ |
|---|---|---|---|---|---|---|---|
| Sprayed (5), 9 days (6), 7 g/a | 2.47 | 2.43 | 2.34 | 2.67 | 2.65 | 2.08(7) | 2.44 |

(1) 17.16% w/v $P_2O_5$, pH 3 solution.
(2) 17.16% w/v $P_2O_5$, acid solution (pH less than 1.0).
(3) 17.16% w/v $P_2O_5$, pH 3 solution + 12 ml $NH_4OH$/250 ml of solution.
(4) 17.16% w/v $P_2O_5$, pH 7 solution Na form.
(5) 17.16% w/v $P_2O_5$, pH 3 solution.
(6) Days after planting.
(7) Senescence of first leaves.
Plants grown from seed.

TABLE 10

(Peas—Alaska 81, harvested 8/5/87, 26-days-old)

|  | 2 plants/pot (dry wt. g) |  |  |  |  |  | X̄ |
|---|---|---|---|---|---|---|---|
| Control (untreated) | 0.86 | 0.74 | 0.68 | 0.91 | 0.86 | 0.56 | 0.77 |
| Sprayed (1), 8 days (6), 5 g/a | 0.88 | 1.16 | 0.91 | 0.93 | 1.29 | 0.59 | 0.96 |
| Sprayed (1), 8 days (6), 10 g/a | 1.08 | 1.02 | 1.19 | 0.86 | 1.02 | 0.76 | 0.99 |
| Sprayed (2), 14 days (6), 7 g/a | 0.97 | 0.80 | 0.63 | 0.66 | 1.02 | 0.81 | 0.82 |
| Sprayed (3), 21 days (6), 7 g/a | 0.73 | 0.56 | 0.84 | 0.94 | 0.87 | 0.73 | 0.78 |
| Sprayed (2), 21 days (6), 7 g/a | 0.84 | 0.66 | 1.09 | 0.71 | 0.94 | 0.99 | 0.87 |

(1) Solution 21.85% w/v $P_2O_5$, pH 3.
(2) Solution 17.16% w/v $P_2O_5$, pH 3.
(3) Solution 17.16% w/v $P_2O_5$, pH 7 Na form.
(6) Days after planting.
Plants grown from seed.

TABLE 11

(Alfalfa—c.v. Vernema, harvested 10/8/87, 55-days-old)

|  | 9 plants/pot (dry wt. g) |  |  |  |  | X̄ |
|---|---|---|---|---|---|---|
| N and P fertilization to soil | 0.43 | 0.44 | 0.66 | — | — | 0.51 |
| N fertilization to soil | 0.30 | 0.25 | 0.20 | 0.22 | 0.24 | 0.24 |
| Sprayed (1), 27 days (6), 10 g/a | 0.48 | 0.24 | 0.62 | 0.56 | 0.47 | 0.47 |
| Sprayed (2), 27 days (6), 10 g/a | 0.54 | 0.45 | 0.44 | 0.62 | 0.51 | 0.51 |
| Sprayed (3), 27 days (6), 10 g/a | 0.38 | 0.38 | 0.27 | 0.23 | 0.53 | 0.36 |
| Sprayed (4), 27 days (6), 10 g/a | 0.27 | 0.42 | 0.70 | 0.55 | 0.43 | 0.47 |
| Sprayed (5), 27 days (6), 10 g/a | 0.59 | 0.55 | 0.52 | 0.36 | 0.45 | 0.49 |

(1) Solution 21.85% w/v $P_2O_5$, pH 3.
(2) Solution 21.85% w/v $P_2O_5$, pH 3 + benzyl amino purine.
(3) Solution 12.0% w/v $P_2O_5$, pH 3.
(4) Solution 12.0% w/v, $P_2O_5$, pH 3 + benzyl amino purine.
(5) Solution 12.0% w/v, $P_2O_5$, pH 3 with all K replaced by $NH_4$.
(6) Days after planting.
Plants grown from seed.

TABLE 12

(Red Clover (cv. Lakeland Red, harvested 10/8/87, 55-days-old)

|  | 9 plants/pot (dry wt. g) |  |  |  |  | X |
|---|---|---|---|---|---|---|
| N and P fertilization to soil | 0.39 | 0.45 | 0.60 | — | — | 0.48 |
| N fertilization to soil | 0.15 | 0.17 | 0.23 | 0.20 | 0.32 | 0.21 |
| Sprayed (1), 27 days (6), 10 g/a | 0.15 | 0.18 | 0.14 | 0.23 | 0.22 | 0.18 |
| Sprayed (2), 27 days (6), 10 g/a | 0.12 | 0.35 | 0.31 | 0.18 | 0.21 | 0.23 |
| Sprayed (3), 27 days (6), 10 g/a | 0.27 | 0.26 | 0.11 | 0.19 | 0.20 | 0.21 |
| Sprayed(4), 27 days (6), 10 g/a | 0.26 | 0.24 | 0.49 | 0.16 | 0.20 | 0.27 |
| Sprayed(5), 27 days (6), 10 g/a | 0.52 | 0.30 | 0.44 | 0.33 | 0.37 | 0.39 |

(1) Solution 21.85% w/v $P_2O_5$, pH 3.
(2) Solution 21.85% w/v $P_2O_5$, pH 3 + benzyl amino purine (200 mg/l).
(3) Solution 12.0% w/v $P_2O_5$, pH 3.
(4) Solution 12.0% w/v, $P_2O_5$, pH 3 + benzyl amino purine (200 mg/l).
(5) Solution 12.0% w/v, $P_2O_5$, pH 3, pH adjusted only with $NH_4OH$.
(6) Days after planting.
Plants grown from seed.

and formulations of ethylene glycol phosphate ester fertilizer solutions prepared as described in Example 1 above unless otherwise indicated. In some of the tables further dilution is indicated. In some cases the pH was adjusted to higher levels. Also in some cases the sodium or potassium forms presented in Examples 3 and 4 were used as noted in the Tables.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A method of fertilizing comprising the step of spraying a hygroscopic liquid onto plants at an application rate no greater then twenty gallons per acre, wherein the liquid includes at least one phosphate ester, sufficient hygroscopic liquid to maintain the spray in a liquid state between 1 and 7 days and has a concentration of phosphate ester between 0.5 to 4 molar wherein the hygroscopic liquid spray includes less than 15 to 20 percent of simple phosphate salts.

2. A method in accordance with claim 1 wherein the hygroscopic liquid is sprayed in the form of droplets most which are about 250 microns and are sufficiently s 3. A method in accordance with claim 1 wherein at least one phosphate ester is a phosphate alcohol ester including alcohol moieties with 2 to 4 carbon atoms.

4. A method in accordance with claim 3 wherein the liquid includes at least one hygroscopic alcohol.

5. The combination of liquid aqueous foliar fertilizer and plants, comprising:

an effective amount of at least one phosphate ester compound in sufficient concentration in said liquid aqueous foliar fertilizer to be of nutritional value to plants on the plants in a volume of lower than twenty gallons of said liquid aqueous foliar fertilizer per acre of plants;

an hygroscopic agent in said liquid aqueous foliar fertilizer which extracts available moisture from the atmosphere to help maintain applied aqueous fertilizer in liquid form on the foliage for from 1 to 7 days;

a water miscible foliage adhering agent in said liquid aqueous foliar fertilizer for enhancing retention of the fertilizer when applied to the surface of the foliage;

said aqueous foliar fertilizer including less than 15 to 20 percent of simple phosphate salts.

6. A combination according to claim 5 wherein the at least one phosphate ester compound present in the fertilizer includes a glycerol phosphate ester.

7. A combination according to claim 5 wherein the at least one phosphate ester compound present in the fertilizer includes an ethylene glycol phosphate ester.

8. A combination according to claim 5 wherein the at least one phosphate ester compound present in the fertilizer includes a propylene glycol phosphate ester.

9. A combination according to claim 5 wherein the at least one phosphate ester is present in a collective concentration from 5% to 45% by weight of the foliar fertilizer.

10. A combination according to claim 5 further comprising a phloem mobility agent for increasing the phloem mobility of the foliar fertilizer.

11. A combination according to claim 10 wherein the phloem mobility agent comprises benzyl amino purine.

12. A combination according to claim 5 including an effective amount of a metal of nutritional value to foliar plants which is substituted into at least one phosphate ester.

13. A liquid aqueous foliar fertilizer according to claim 12 wherein the metal is selected from the group consisting of sodium, potassium, copper, iron, manganese, magnesium, zinc, calcium, and cobalt.

14. A method for treating plants to provide nutritional supplementation of phosphorus, comprising:

applying a liquid aqueous foliar fertilizer solution to the foliage of plants in the form of discrete droplets;

said foliar fertilizer solution including at least one liquid, water miscible, phosphate alcohol ester in collective concentration thereof greater than 0.5 molar, less than 15 to 20 percent of simple phosphate salts and at least one hydroscopic agent in sufficient quantity to extract moisture from the atmosphere to help maintain applied droplets of foliar fertilizer in liquid form on the foliage for at least one day.

15. A method for treating plants to provide nutritional supplementation of phosphorus according to claim 14 wherein said at least one phosphate ester includes a polyhydroxy alkane alcohol phosphate ester.

16. A method for treating plants to provide nutritional supplementation of phosphorus according to claim 14 wherein said at least one phosphate ester includes at least one orthophosphate alcohol ester having alcohol moieties taken from the group consisting of ethylene glycol, propylene glycol and glycerol.

17. A method for treating plants to provide nutritional supplementation of phosphorus according to claim 14 wherein said at least one liquid phosphate ester is present in a collective concentration of approximately one half molar or greater.

18. A method for treating plants to provide nutritional supplementation of phosphorus according to claim 14 wherein said at least one liquid hygroscopic agent is present in a collective concentration of approximately one molar or greater.

19. A method for treating plants to provide nutritional supplementation of phosphorus according to claim 14 wherein said at least one liquid phosphate ester is present in a collective concentration of approximately ½ to 4 molar.

* * * * *